(No Model.)
L. PENTZ.
VEHICLE SPRING.
No. 500,154. Patented June 27, 1893.
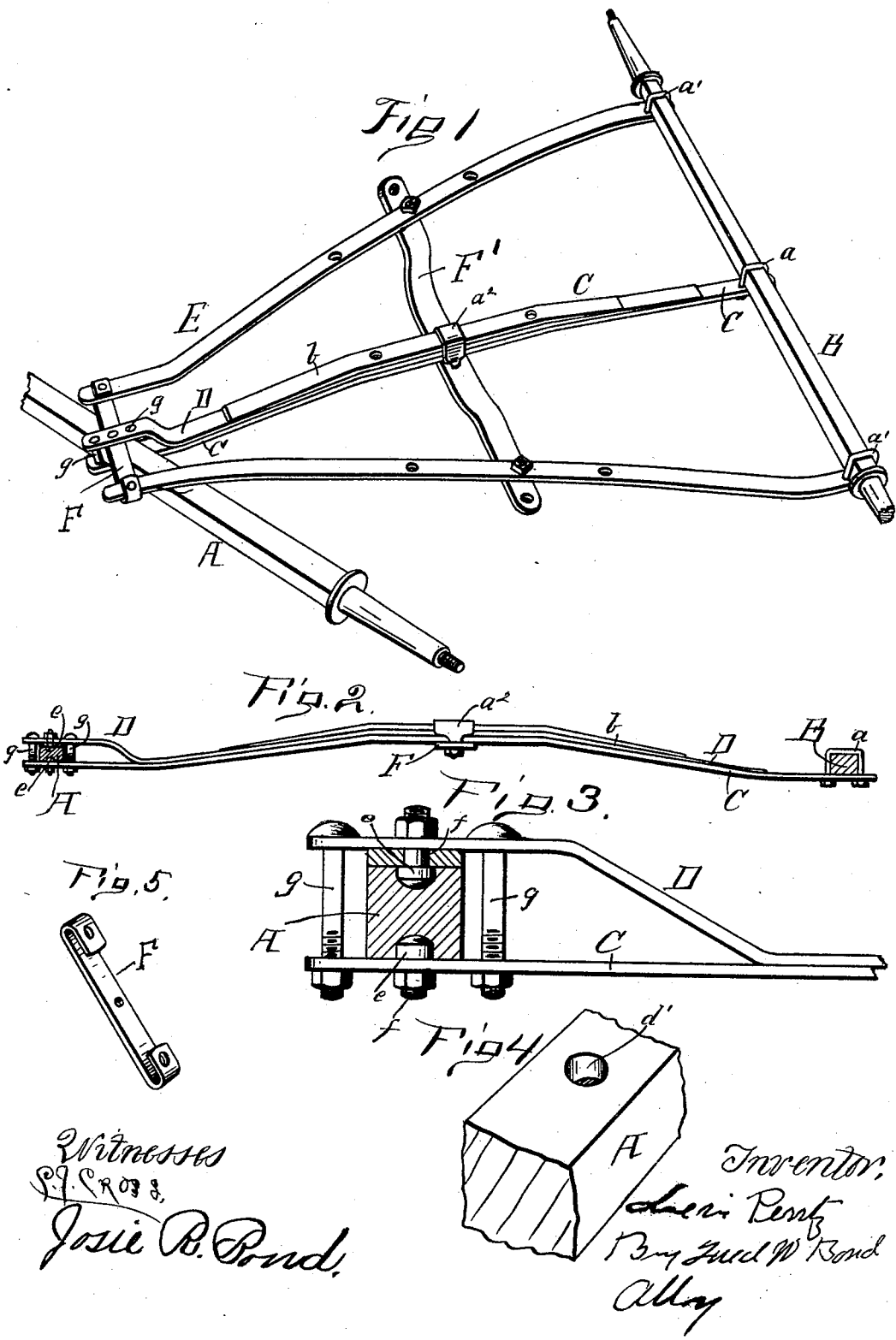

UNITED STATES PATENT OFFICE.

LEVI PENTZ, OF CANTON, OHIO, ASSIGNOR OF TWO-THIRDS TO CHARLES L. LEHMAN, OF SAME PLACE, AND ISRAEL J. LEHMAN, OF CLEVELAND, OHIO.

VEHICLE-SPRING.

SPECIFICATION forming part of Letters Patent No. 500,154, dated June 27, 1893.

Application filed November 14, 1892. Serial No. 451,904. (No model.)

*To all whom it may concern:*

Be it known that I, LEVI PENTZ, a citizen of the United States, residing at Canton, in the county of Stark and State of Ohio, have invented certain new and useful Improvements in Vehicle-Springs; and I do hereby declare that the following is a full, clear, and exact description of the same, reference being had to the annexed drawings, making a part of this specification, and to the letters of reference marked thereon, in which—

Figure 1, is an isometrical view. Fig. 2, is a transverse section of the axles, and an edge view of the center spring. Fig. 3, is a transverse section of the front or forward axle illustrating the pivotal connection. Fig. 4, is a detached view of a portion of the front or forward axle, showing one of the sockets. Fig. 5, is a detached view of the connecting bar.

The present invention has relation to vehicle springs, and it consists in the different parts and combination of parts hereinafter described and particularly pointed out in the claims.

Similar letters of reference indicate corresponding parts in all the figures of the drawings.

In the accompanying drawings, A represents the front or forward axle, and B represents the rear axle; said axle being constructed in the ordinary manner, reference being had to the peculiar manner of attaching the springs to the front or forward axle A. The main leaf or bar C, extends from the front or forward axle, rearward, and is connected to the rear axle by means of the clip $a$, or its equivalents. Upon the top or upper side of the main leaf C, is attached the leaf D, the front or forward end of said leaf being bent or curved substantially as illustrated in Figs. 1, 2, and 3; said bent or curved portion forms a yoke to receive the front or forward axle. For the purpose of strengthening the center spring proper, the additional leaf $b$, is provided, and is located upon the top of the leaf D, making in all three leaves to the spring; but it will be understood that the number of leaves may be increased for the purpose of adding strength to the spring without departing from the nature of my invention.

The front or forward axle A, is provided with the sockets $d'$, which sockets are located directly opposite each other, as shown in Fig. 3. The sockets $d'$ are for the purpose of receiving and holding the bolt-heads $e$, which bolt-heads are formed of such a shape that they will provide suitable bearings for the front axle, and are to take the place of the common king-bolt. The object and purpose of providing the sockets $d'$, and seating therein the bolt-heads $e$, is to provide a means for pivotally connecting the front or forward axle without weakening said axle; as it will be understood that no aperture is formed through the axle. The bolt heads $e$, are formed upon the ends of the bolts $f$, said bolts being provided with ordinary screw threaded ends to receive ordinary screw threaded nuts; but it will be understood that the same object can be accomplished by means of rivets, but I prefer to use clamping-bolts such as shown in the drawings.

The side springs E, are located substantially as illustrated in Fig. 1, and may be formed of a single piece of spring steel, or they may be composed of any desired number of leaves. The rear ends of the side springs E, are securely attached to the rear axle B, by means of the clips $a'$, or their equivalents; the front or forward ends of said springs being attached to the connecting-bar F, which connecting-bar is attached to the bent or curved portion of the leaf D.

For the purpose of securely holding the heads $e$, in the sockets $d'$, the clamping-bolts $g$ are provided, which clamping-bolts are located substantially as illustrated in Figs. 1, 2, and 3; said clamping-bolts being set a short distance away from the edges of the axle A, thereby permitting the axle to turn upon its pivotal points.

For the purpose of bracing the side springs E, the bar F', is provided, which bar is attached to the center spring proper, by means of the clip $a^2$, or its equivalent. The bar F, should be formed heavy enough to give it the desired amount of rigidity to properly brace the side springs E. It will be understood that the center spring proper, forms a reach; or in other words takes the place of the common rigid reach, thereby providing a means for the axles A and B to come toward each other, and recede from each other as the springs vibrate.

The vehicle body is attached to the side springs and center spring in any convenient manner, clamping-bolts being preferable; the clamping bolts passing through the bottom or under portion of the vehicle body.

In the drawings the connecting-bar F, is shown located upon the top or upper side of the axle; but it will be understood that said connecting-bar may be located upon the bottom or under side of the axle without departing from the nature of my invention, as it is immaterial whether said bar is located upon the top or bottom of the front axle.

Having fully described my invention, what I claim as new, and desire to secure by Letters Patent, is—

1. The combination of the axles A and B, the center-spring C connected to said axles, the leaf D, the side-springs E, the connecting bar F, the sockets $d'$, and the bolts $f$, provided with the heads $e$, substantially as and for the purpose specified.

2. The combination of the axles A and B, the springs C and E, the sockets $d'$, the brace F', attached to the springs C and E, and the clamping-bolts $g$, all arranged substantially as and for the purpose specified.

In testimony that I claim the above I have hereunto subscribed my name in the presence of two witnesses.

LEVI PENTZ.

Witnesses:
CHAS. M. STANDS,
F. W. BOND.